US006182977B1

(12) United States Patent
Weller

(10) Patent No.: US 6,182,977 B1
(45) Date of Patent: Feb. 6, 2001

(54) CLAMPING DEVICE

(75) Inventor: Hans-Michael Weller, Marbach (DE)

(73) Assignee: Hainbuch GmbH Spannende Technik, Marback (DE)

(*) Notice: Under 35 U.S.C. 154(b), the term of this patent shall be extended for 0 days.

(21) Appl. No.: 09/308,495

(22) PCT Filed: Nov. 11, 1997

(86) PCT No.: PCT/EP97/06287

§ 371 Date: Jul. 16, 1999

§ 102(e) Date: Jul. 16, 1999

(87) PCT Pub. No.: WO98/22246

PCT Pub. Date: Mar. 28, 1998

(30) Foreign Application Priority Data

Nov. 20, 1996 (DE) ........................................ 196 47 996

(51) Int. Cl.[7] .......................... B23B 31/30; B23B 31/42; B23Q 3/08

(52) U.S. Cl. ........................ 279/2.08; 242/571.1; 269/22; 279/2.07; 279/4.03; 403/31

(58) Field of Search ................................ 279/2.07, 2.08, 279/4.03; 269/22, 48.1; 403/15, 31; 242/571.1, 571.2

(56) References Cited

U.S. PATENT DOCUMENTS 2,040,466 * 5/1936 Christy .................................. 269/22
3,507,507 4/1970 Tobler et al. ............................ 279/2
3,602,521 8/1971 Uhtenwoldt .......................... 279/1 Q
3,663,027 5/1972 Klipping .................................. 279/4
4,099,732 * 7/1978 Threatt ............................... 279/20.8
4,151,826 * 5/1979 Otte ....................................... 269/22
4,253,694 3/1981 Walter et al. .......................... 294/93
5,197,720 3/1993 Renz et al. .......................... 269/48.1
6,059,218 * 5/2000 Berube ................................ 279/2.07

FOREIGN PATENT DOCUMENTS 2019 796 11/1970 (DE) .
29 26 293 1/1981 (DE) .
38 32 582 4/1990 (DE) .
39 09 630 9/1990 (DE) .
1 191 716 10/1959 (FR) .
2 237 729 2/1975 (FR) .
2 439 060 5/1980 (FR) .

* cited by examiner

*Primary Examiner*—Steven C. Bishop
(74) *Attorney, Agent, or Firm*—Foley & Lardner

(57) ABSTRACT

The clamping apparatus (10) has a clamping ring (13) of an elastomer, which has a U-shaped cross section. The clamping ring (13) is seated in a recess (15) in a holding device (12) having parallel side walls. The recess (50) can be connected via a connecting line (18) to a hydraulic or pneumatic pressure source. The outside of the web part (21) of the U-profile acts as a clamping surface (24). Embedded in the area of this clamping surface is a number of clamping elements (27) made of a material of higher strength, in which at least that envelope line which faces away from the clamping surface (24) is exposed. The clamping elements (27) have the same axial extent as the clamping ring (13). One of the side walls of the recess (15) is formed by a clamping part (31), which is part of a clamping device (36) and is guided axially displaceably on the holding device (12) and is sealed off with respect to the latter by means of a circumferential seal element (34). The clamping part (31) is coupled to a power drive (36) which acts in the axial direction. The clamping apparatus (10) is considered both for external clamping and for the internal clamping of a workpiece.

10 Claims, 2 Drawing Sheets

CLAMPING DEVICE

BACKGROUND

When workpieces of different types are being machined, they have to be firmly held in a stationary manner in a specific position, or they have to be clamped to a movable or immovable machine part in a machining unit. In both cases, the clamping apparatus used for this not only has to position the workpiece but also has to absorb and transmit the forces arising from a machining operation. In the process, the shape of the workpiece must not be changed, either by the clamping forces or by the machining forces. This- applies, above all, to thin-walled workpieces. These forces are for the most part absorbed by a frictional connection.

Clamping sleeves are often used to clamp round workpieces to a machining unit. The clamping sleeves are designed to be relatively thin-walled. One side of the clamping sleeve serves as a contact surface on the workpiece, to be specific either on an external surface of the workpiece or on an internal surface of a hollow workpiece. On the other side, there is a relatively narrow annular space between the clamping sleeve and the machine part which is adjacent to it and in which the clamping sleeve is fitted. This annular space is sealed off in both axial directions. If a hydraulic or pneumatic operating medium in this annular space is pressurized, the clamping sleeve deforms elastically in the direction of the workpiece and clamps the latter firmly. Because the clamping sleeve, for its part, is connected to the machine part which accommodates it by a positive connection or a frictional connection, it is possible for the machining forces acting on the workpiece to be transmitted to the machine part, or conversely from the machine part to the workpiece.

The clamping sleeves have the disadvantage that their ability to be deformed radially is only very low and, in addition, this ability decreases further from the central longitudinal section outward to the two end sections. Clamping sleeves can therefore be used only to clamp workpieces which lie within a very small range of diameters. The consequence of this is that workpieces which are not machined in the clamping area often cannot be firmly clamped by means of clamping sleeves.

The chucks which are used for clamping workpieces with an adequately great dimensional strength and which generally have three clamping jaws cannot be used in the case of workpieces with a low dimensional strength, in particular in the case of thin-walled workpieces. The clamping tongues which are often used in addition cannot reliably clamp workpieces having large tolerances on the diameter or shape deviations, for example non-roundness. In addition, in the case of these chucks the radial clamping force is distributed to a few circumferential points, in particular when the actual diameter of the workpiece does not coincide exactly with the nominal diameter of the clamping tongues. Thin-walled workpieces are then subjected to an increased risk of deformation.

SUMMARY OF THE INVENTION

The invention is based on the object of providing a clamping apparatus with which even workpieces having large tolerances on the diameter and/or shape errors can be clamped reliably, and with which even workpieces with a low dimensional strength, in particular thin-walled workpieces, can be clamped, at least with low deformation, and can also be machined. This object is achieved by a clamping apparatus having the features described further below.

The fact that, in the clamping apparatus, the higher-strength clamping elements are embedded in the clamping surface of the clamping ring, made of an elastomer, and the fact that the clamping ring has a U-shaped cross section and is arranged in a circumferential recess, matched to it, in the clamping apparatus, means that the clamping elements are pressed against the workpiece when the internal space of the U profile is acted on by a hydraulic or pneumatic operating medium, and the workpiece is therefore firmly clamped radially. In the process, the end walls of the clamping ring are pressed against that side wall of the recess of the clamping apparatus which is in each case adjacent to it. As a result, on the one hand the internal space of the clamping ring is sealed off well to the outside, and on the other hand a good frictional connection between the end walls of the clamping ring and the clamping apparatus is achieved, which firmly clamps the clamping ring itself in the clamping apparatus. As a result, ultimately the workpiece is clamped radially to the machine part to which the clamping apparatus is fastened. At the same time, the high elasticity of the clamping ring means that relatively great tolerances on the diameter and even other shape deviations of the workpiece, such as non-roundness, can be bridged very well.

The fact that the clamping ring can be displaced within certain limits in the holding device when the operating medium is not pressurized, or at low pressures of the operating medium, and also can still be deformed after the pressure of the operating medium has been increased, because of the elasticity of the material of the clamping ring, means that the workpiece can be set to the intended radial desired position within these limits. This makes it possible, for example, to accommodate a workpiece between two points and, by means of the clamping apparatus, to absorb the torque which occurs in the case of material-removing machining or, conversely, to transmit said torque to the workpiece, even when there are relatively great tolerances on the diameter and/or relatively great deviations from the circularly cylindrical shape at the clamping point of the workpiece, or if there is a non-concentric clamping surface.

The fact that a relatively large number of higher-strength clamping elements are distributed in the circumferential direction on the circumference of the elastic clamping ring means that the radial clamping forces, which are identical to one another, are distributed to a corresponding number of circumferential points, so that the radial clamping force of the individual clamping element can be kept relatively low, and a high overall clamping force is nonetheless achieved. Because of the elasticity of the clamping ring, each clamping element can adjust to a relatively great extent to that deviation of the workpiece surface from the ideal surface which is present in its circumferential section, without the clamping force exerted by said clamping element changing.

The fact that there is a clamping device, by means of which, following the radial clamping of the workpiece by the clamping elements, the latter themselves can be axially firmly clamped, means that the clamping of the workpiece is fixed, and hence the influence of the compliance of the clamping ring is completely eliminated, and the workpiece is virtually completely rigidly clamped. It is even possible for the clamping ring to be relieved of the radial clamping force. With regard to the subsequent rigid clamping of the clamping elements, their initial radial clamping force can be kept lower. This reduces the elastic deformation, above all in the case of thin-walled workpieces, whose roundness is thus improved. This is still further assisted by the fact that use is made of clamping elements whose dimension in the circumferential direction of the clamping ring is relatively small and that for this purpose the number of clamping elements is selected to be all the greater.

In a refinement of the present invention, the clamping ring is guided relatively close to the clamping apparatus, so that the workpiece is also positioned by the clamping apparatus within certain limits. In another alternative refinement of the present invention, it is conversely possible for the workpiece, together with the clamping apparatus, to be adjusted arbitrarily to a relatively great extent within the clamping apparatus and hence within the machining unit, so that, for example, relatively great shape deviations can be compensated for, such as those which often occur with unmachined pieces.

Using a refinement of the present invention, it is also possible to use the clamping apparatus to reliably clamp those workpieces which have shape deviations in the axial direction, in particular deviations of the clamping surface of the workpiece from an axially parallel course, such as is given, for example, in the case of a conical clamping surf ace or one which is bowed inward or bowed outward.

In yet another refinement, a relatively great axial clamping force can be exerted on the clamping elements with a low area pressure.

In an alternative refinement, it is possible to use commercially available parts, for example the rollers of cylindrical roller bearings, which naturally have high accuracy and high strength.

BRIEF DESCRIPTION OF THE DRAWINGS

In the following text, the invention will be explained in more detail with reference to exemplary embodiments illustrated in the drawing, in which.

DETAILED DESCRIPTION

Figure 1:
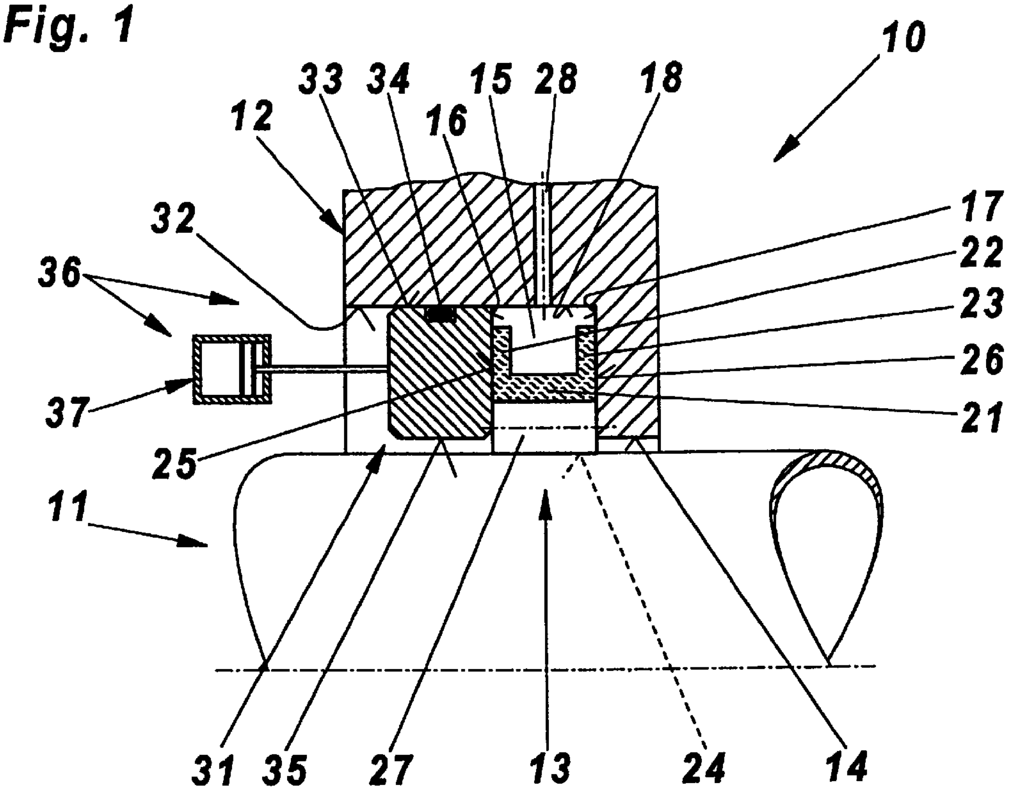
FIG. 1 shows a longitudinal section, shown as a detail, of a clamping apparatus having external clamping, together with a workpiece.

The clamping apparatus 10 which can be seen from FIG. 1 is used to clamp a cylindrical workpiece 11, for example in the form of a pipe section or of a shaft, a rod or bar from the outside, in order to exert a torque on the workpiece 11, primarily in the circumferential direction, it being simultaneously possible also for an axial clamping force to be exerted in both axial directions.

Of the clamping apparatus 10, only a holding device 12 for a clamping ring 13 is illustrated. Outside the area illustrated, the holding device, which surrounds the workpiece 11 annularly, either has fastening elements, by means of which it can be arranged in a stationary manner, or has coupling elements, by means of which it can be coupled to a machine part of a machining unit for the machining of the workpiece 11.

For the cylindrical workpiece 11, the holding device 12 has a hollow cylindrical recess 14, whose clear width is greater than the external dimension of the workpiece 11. On the inside, the holding device 12 has a circumferential recess or groove 15, which is matched to the external shape of the clamping ring, in particular to its width. The side walls 16 and 17 of the groove 15 are of plane parallel design. The groove base 18 is a cylindrical surface.

Corresponding to the cylindrical shape of the workpiece 11, the clamping ring 13 is an intrinsically closed circular ring with a U-shaped cross-sectional profile. The U profile is formed by three profile parts which join one another, the web part 21, the flange part 22 and the flange part 23. The U profile is aligned in such a way that the outside of the web part 21, facing away from the flange parts 22 and 23, this part being hidden in FIG. 1, is placed on the inside of the clamping ring 13. It forms the clamping surface 24 of the clamping ring 13. At the same time, the flange parts 22 and 23 of the U profile constitute disk-like flanges of the clamping ring 13 which project radially outward from the web part 21. The two end surfaces 25 and 26 of the clamping ring 13 are of plane parallel design.

The clamping ring 13 consists of an elastomer which is shaped to form the clamping ring 13 using a process appropriate to its properties.

On the clamping ring 13, in the circumferential direction along its clamping surface 24, a number of clamping elements 27 are embedded in the material of the clamping ring 13. They have the same axial extent as the clamping ring 13 itself. As can be seen from FIG. 1, in the simplest case they are designed as cylindrical rollers, such as are used, for example, for rolling-contact bearings. The clamping elements 27 are embedded in the clamping ring 13 in such a way that at least that envelope line is exposed, that is to say not covered by the material of the clamping ring 13, which is placed in the section plane which passes diametrically through the longitudinal axis of the workpiece 11 and through the longitudinal axis of the clamping elements 27. It is expedient if, beyond this envelope line, a circumferential section of the clamping elements 27 which is adjacent at both sides to said envelope line is also exposed.

A feed line 28 for a hydraulic or pneumatic operating medium opens into the circumferential groove 15 in the holding device 12 which accommodates the clamping ring 13. This feed line 28 is connected outside the holding device 12 to a pressure source for the operating medium, so that the operating medium in the annular cavity of the clamping ring 13 can be pressurized and also relieved of pressure again.

The clamping ring 13 is shaped such that, in the relieved state or rest state, the clamping ring 13 and its clamping elements 27 are set back radially outward to a certain extent from the surface of the workpiece 11, in order that the workpiece 11 can be inserted into the clamping apparatus 10. As soon as the operating medium in the remaining cavity of the annular groove 15 is pressurized via the feed line 28, the web part of the U profile of the clamping ring 13, together with the clamping elements 27 embedded therein, are displaced radially inward in the direction of the workpiece 11, until the clamping elements 27 and also those sections of the clamping surface 24 which remain between the clamping elements 27 at least partly rest closely against the workpiece 11. The higher the pressure in the annular groove 15, the higher is the contact force and hence also the clamping force of the clamping apparatus 10 which is exerted on the workpiece 11. The latter is then clamped both in the circumferential direction and in the axial direction in the clamping apparatus.

By means of the pressurized operating medium, the flanges 22 and 23 of the clamping ring 13 are also pressed in the axial direction against the side wall 16 and 17, respectively, of the holding device 12. As a result, the flanges 22 and 23 act as annularly circumferential sealing lips, which prevent the operating medium escaping. In addition, this contact force of the flanges and at least of the adjacent part of the web part effects an appropriately high frictional force between the clamping ring 13 and the holding device 12, so that the clamping ring 13 is firmly clamped in the holding device 12, primarily in the circumferential direction but also in the radial direction. By this means, both clamping and holding forces can be transmitted by the clamping apparatus 10 to the workpiece 11 and, conversely, forces otherwise acting on the workpiece 11 can also be absorbed by the clamping apparatus 10 and passed on to the adjacent machine part.

Since the clamping ring 13 is produced from an elastomer, and there is no rigid mechanical connection with the holding part 12, and since in addition the operating medium acts to the same extent at every circumferential point on the clamping ring 13, the clamping ring 13 is not able to center the workpiece 11. Adjusting the workpiece 11 to a specific attitude of its longitudinal axis must be achieved by other means. When the clamping apparatus 10 is activated, the clamping ring 13 is centered on the workpiece 11 and holds it firmly in its centered position and, in so doing, at least to some extent relieves the load on the centering device or guide device for the workpiece 11.

On the holding device 12, the side wall 16 of the recess 15 is formed by that wall surface of a clamping part 31 which faces it. The clamping part 31 is guided displaceably on the holding device 12 in the axial direction along a cylindrical guide surface 32 which adjoins the groove base 18 of the recess 15. The outer circumferential surface 33 of said clamping part rests on the guide surface 32. In the area of this external circumferential surface 33 there is a circumferential groove, in which a circumferential seal element 34 is arranged, which seals off the interior of the recess 15 to the outside. The inner circumferential surface 35 has a clear width which is greater than the largest external diameter of the workpiece.

The clamping part 31 is part of a clamping device 36, which is equipped with a power drive in the form of a double-acting piston drive 37, by means of which the clamping part 31 can be displaced axially on the holding device 12 and can be pressed against the clamping ring 13. As a result, the clamping elements 27 are pressed against the opposite side wall 17 of the holding device 12, and are thus firmly clamped both in the axial direction and in the radial direction and in the circumferential direction in the holding device 12, said clamping elements in turn clamping the workpiece 11 in the same way. The power drive 36 is indicated in FIG. 1 only by the symbol of a double-acting piston drive. It may be designed in any form which is conventional in such an application.

Figure 2:
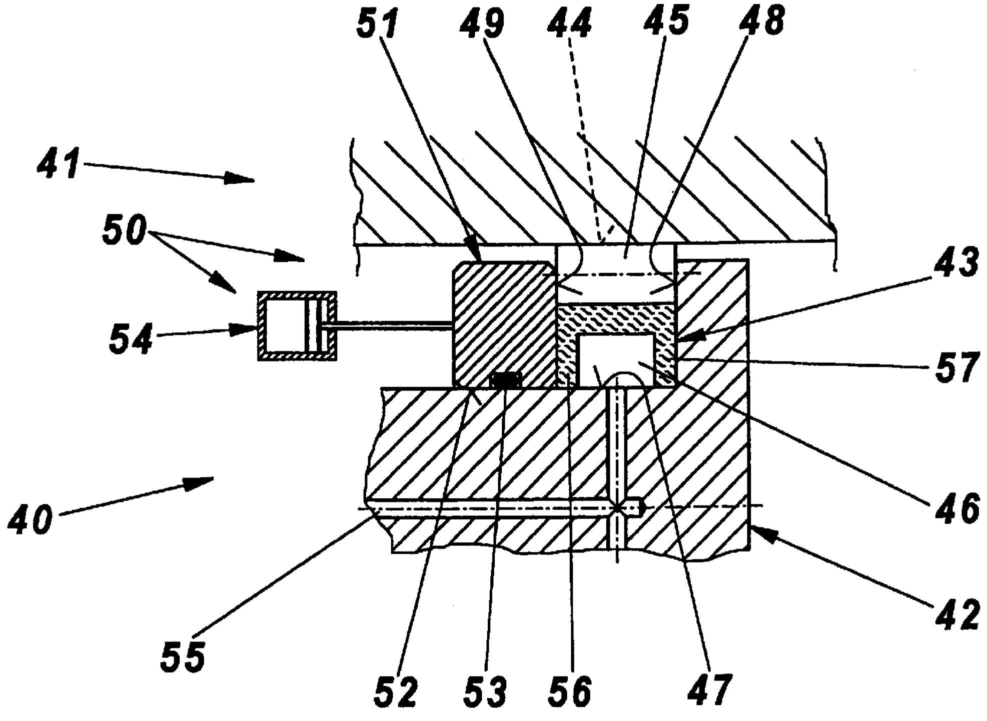
FIG. 2 shows a longitudinal section, shown as a detail, of a clamping apparatus having internal clamping, together with a workpiece.

The clamping device or apparatus 40 which can be seen from FIG. 2 is intended for the internal clamping of a workpiece 41 which is at least partly hollow. Accordingly, its holding device 42 for the clamping ring 43 is designed to be bar-shaped.

In a similar way to the clamping ring 13, the clamping ring 43 likewise has a U-shaped cross-sectional profile, but here it is aligned in the converse direction. The clamping surface 44 (hidden in FIG. 2) is formed by the external circumferential surface of the clamping ring 43. Along this circumferential surface, clamping elements 45 are embedded in the clamping ring. Otherwise, reference is made to the description of the clamping ring 13, which applies in an identical way or at least in a corresponding way to the clamping ring 43.

On the holding device 42, there is a recess 46 which is matched to the clamping ring 43. It is bounded on the inside and on one end by a circumferential surface 47 and, respectively, a wall surface 48 of the holding device 42. On the other side, the recess 46 is formed by that wall surface 49 of a clamping part 51 which faces it, said clamping part 51 being part of a clamping device 50. The clamping part 51 is guided displaceably on the holding device 42. Its inner circumferential surface 52 rests on the circumferential surface 47 of the holding device 42. On the clamping part 51, on its inner circumferential surface 52, there is a circumferential groove, in which a seal element 53 is arranged. In FIG. 2, the clamping part 51 is coupled to a power drive 54, which is indicated by the symbol of a double-acting piston drive and which is likewise part of the clamping device 50. By means of the power drive 54, the clamping part 51 can be displaced in the axial direction on the holding device 42 and pressed against the clamping ring 43.

The holding device 42 has a feed line 55 for a hydraulic or pneumatic operating medium, which can be led from a pressure source into the interior of the U profile of the clamping ring 53, in order to press the clamping ring 43 against the workpiece 41 and to clamp the workpiece 41 firmly, as was explained in a corresponding manner in the case of the clamping apparatus 10.

In the case of the clamping apparatus 40, the two flanges 56 and 57 of the clamping ring 43 reach as far as that circumferential surface 47 of the holding device 42 which is opposite them. In its rest position the clamping ring 43 is therefore guided in the radial direction on the holding device 42, at least to a certain extent, so that it can pre-center the workpiece 41 to a corresponding extent. With regard to the elasticity of the clamping ring 43, and with regard to the fact that the pressure forces of the operating medium act uniformly on all sides in it too, precise centering of the workpiece 41 is not possible in the case of the clamping apparatus 40 either. If the pre-centering is not required or if, instead of pre-centering, even a certain adjustability of the clamping ring 43 in the radial direction is desired, an appropriately large radial distance is maintained between the flanges 56 and 57 of the clamping ring 43 and that circumferential surface 47 of the holding device 42 located opposite them.

When the clamping apparatus 40 is in use, the clamping part 51 is initially located in its starting position, in which the clamping ring 43 can still be freely moved in its recess in the holding part 42. The operating medium for the clamping ring 43 is pressurized and hence the clamping ring 43, together with its clamping elements 45, is brought into contact with the workpiece 41 and, as a result, the workpiece 41 is clamped radially. The clamping part 51 is then pressed against the clamping ring 43 by means of the power drive 44, and in the process the clamping elements 45 are firmly clamped in the axial direction between the clamping part 51 and that wall part of the holding device 42 located opposite it. As a result of the frictional force produced on the end surfaces of the clamping elements 45, the latter are also firmly clamped in the radial direction and in the circumferential direction. As a result, the elastomeric elements of the clamping ring 43 are primarily relieved of the circumferential forces, but also of the radial forces between the clamping apparatus 40 and the workpiece 41.

Figure 3:
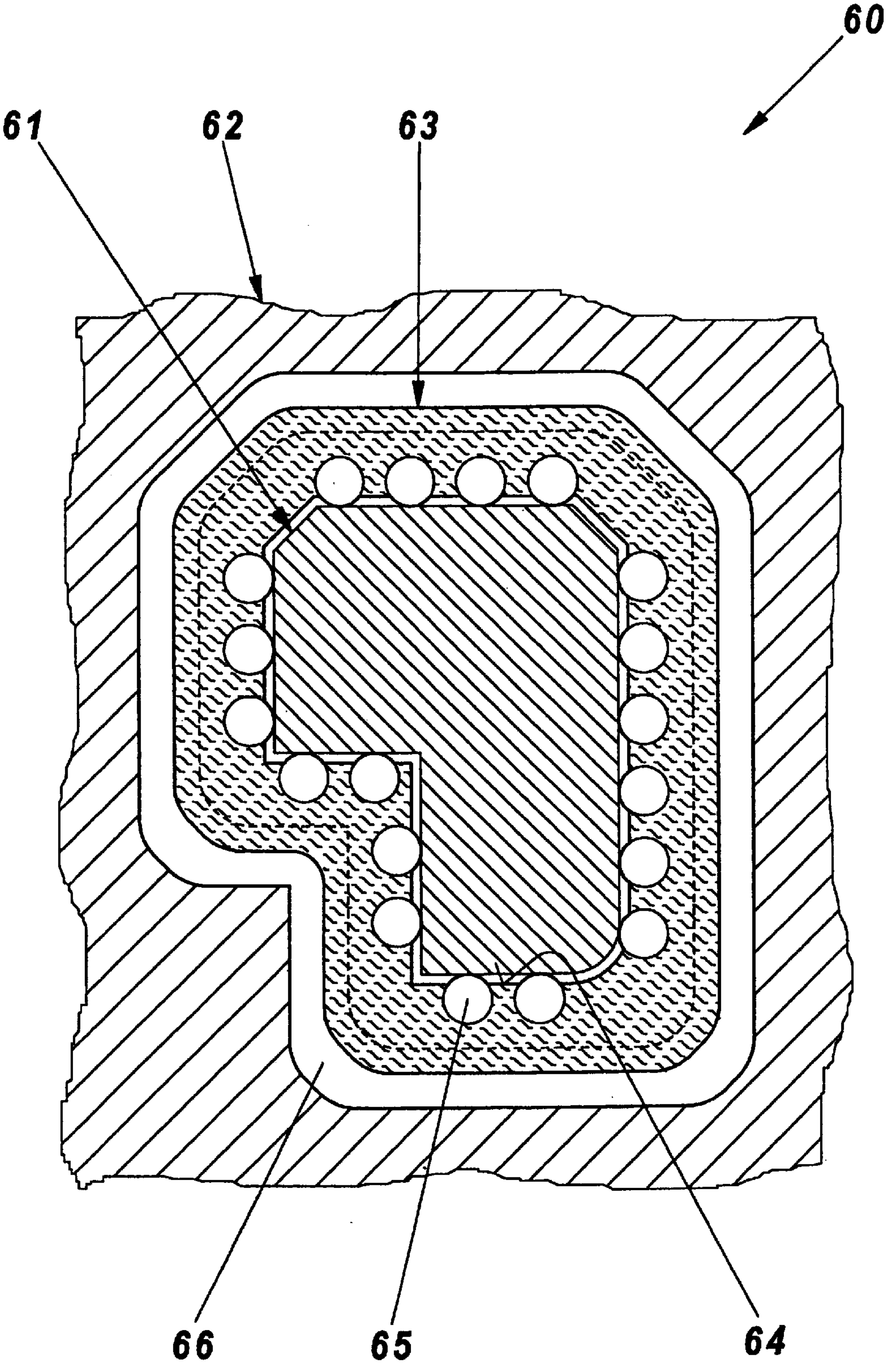
FIG. 3 shows a cross section, shown as a detail, of a further clamping apparatus having external clamping, together with a workpiece of any desired external shape.

FIG. 3 reveals a clamping apparatus 60 for the external clamping of a workpiece 61 which has an irregular cross-sectional shape. The clamping ring 63, which is arranged in an appropriately shaped holding device 62, therefore has a clamping surface whose outline represents an equidistant from the contour line of the workpiece 61. For the purpose of better understanding, the clamping elements 65 of the clamping ring 63 have been illustrated as resting on the workpiece 61, in order to make the clamping operation clear. In the clamping position, the elastomeric elements of the clamping ring 63 will at least to some extent lie closer to the workpiece 61 or even rest on it.

The clamping ring 63 is seated in a recess 66 in the holding device 62 which is matched to its dimensions and to its outline shape. This recess will expediently be composed of a number of parts, for example in order to make it easier to produce the recess 66 or to be able to install a clamping part which corresponds to the outline shape of the clamping ring 63, and to be able to equip it with hydraulic or pneumatic piston drives.

The example illustrated in FIG. 3 of the external clamping of a workpiece of irregular cross-sectional shape may also be applied, mutatis mutandis, to workpieces which do have a regular cross-sectional shape, but this shape is not circular. This also applies to the internal clamping of workpieces with an outline of their holding surface which deviates from the circular line and is either regular or irregular.

What is claimed is:

1. A clamping apparatus comprising:

a single-piece clamping ring having a U-shaped cross-sectional profile including a pair of flange parts and a connecting web part;

the web part having a side facing away from the flange parts configured as a clamping surface for clamping a workpiece having a longitudinal axis, each flange part being positioned to form one end wall of the clamping ring, each flange part having an outer end surface parallel to the outer end surface of the other flange part;

the clamping surface of the clamping ring configured to be approximately equidistant from a surface of the workpiece to be clamped, a plurality of clamping elements located on the clamping surface and extending longitudinally across the clamping ring, said clamping elements comprising a material having a higher strength than that of the clamping ring and being arranged on the clamping ring so that a portion of each clamping element facing the workpiece is exposed;

a holding device for the clamping ring, said holding device having a circumferential recess configured to receive said clamping ring; said holding device having a passage connected to a pressure source for an operating medium at one end and opening at the other end into the circumferential recess of the holding device; the holding device including a clamping device for fully clamping the clamping elements in the longitudinal direction, the clamping device having an annular, intrinsically closed clamping part adapted to move in the longitudinal direction on the holding device and configured to form one side wall of the circumferential recess of the holding device;

a circumferential seal element is positioned between a circumferential surface of the clamping part that faces away from the workpiece and a circumferential surface of the holding device which is opposite the first said circumferential surface;

wherein the clamping part is movable in the longitudinal direction on the holding device from a release position into a clamping position by means of a power drive.

2. The clamping apparatus of claim 1, wherein the clamping apparatus has a rest state wherein an edge surface of each of the flange parts of the clamping ring oppositely facing to the clamping surface contacts a wall of the circumferential recess.

3. The clamping apparatus of claim 1, wherein the clamping apparatus has a rest state, wherein an edge surface of each of the flange parts of the clamping ring oppositely facing to the clamping surface is located at a distance from the holding device.

4. The clamping apparatus of claim 1, wherein a line connecting the clamping element that is closest to the workpiece has the same curve as the workpiece surface.

5. The clamping apparatus of claim 1, wherein each clamping element includes two parallel end surfaces.

6. The clamping apparatus of claim 5, wherein each clamping element is a cylindrical roller.

7. The apparatus of claim 1, wherein the clamping surface is located on the inside of the clamping ring.

8. The apparatus of claim 1, wherein the clamping surface is located on the exterior of the clamping ring.

9. The apparatus of claim 1, wherein the holding device is stationary.

10. The apparatus of claim 1, wherein the holding device is connected to a movable machine.

* * * * *